United States Patent
Howard et al.

(10) Patent No.: US 9,759,482 B2
(45) Date of Patent: Sep. 12, 2017

(54) ARGON PRODUCTION METHOD AND APPARATUS

(71) Applicants: Henry E. Howard, Grand Island, NY (US); Persefoni E. Kechagia, Williamsville, NY (US); Philip A. Barrett, Tonawanda, NY (US); James R. Handley, East Amherst, NY (US)

(72) Inventors: Henry E. Howard, Grand Island, NY (US); Persefoni E. Kechagia, Williamsville, NY (US); Philip A. Barrett, Tonawanda, NY (US); James R. Handley, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/468,234

(22) Filed: Mar. 24, 2017

(65) Prior Publication Data

US 2017/0198968 A1 Jul. 13, 2017

Related U.S. Application Data

(62) Division of application No. 14/192,003, filed on Feb. 27, 2014, now Pat. No. 9,644,890.
(Continued)

(51) Int. Cl.
- F25J 3/00 (2006.01)
- F25J 3/04 (2006.01)
- C01B 23/00 (2006.01)

(52) U.S. Cl.
CPC ....... *F25J 3/04733* (2013.01); *C01B 23/0052* (2013.01); *F25J 3/0409* (2013.01);
(Continued)

(58) Field of Classification Search
CPC .. F25J 3/04654; F25J 3/04666; F25J 3/04672; F25J 3/044678; F25J 3/04709;
(Continued)

(56) References Cited

U.S. PATENT DOCUMENTS

| 3,996,028 A | 12/1976 | Golovko et al. |
| 4,477,265 A | 10/1984 | Kumar et al. |

(Continued)

FOREIGN PATENT DOCUMENTS

| CA | 2 243 389 | 1/1999 |
| DE | 1 272 322 | 7/1968 |

(Continued)

OTHER PUBLICATIONS

Federov, A.N., "Investigation and Improvement of Cryogenic Adsorption Purification of Argon from Oxygen", Gas Separation & Purification, vol. 9, No. 2, pp. 137-145, XP055121716, ISSN: 0950-4214, DOI: 10.1016/0950-4214(95) 93951-F.

*Primary Examiner* — Keith Raymond
(74) *Attorney, Agent, or Firm* — Robert J. Hampsch; David M. Rosenblum

(57) ABSTRACT

A method and apparatus for producing a purified liquid argon product in which liquid argon having oxygen impurities is produced in a cryogenic air separation plant by separating argon from oxygen within an argon column. An impure liquid argon stream, composed of part of the liquid argon, is purified in an adsorbent bed by adsorbing the oxygen impurities in an adsorbent to produce a purified liquid argon stream that constitutes the purified liquid argon product. During adsorption, the adsorbent bed is maintained at a reduced temperature with a coolant to prevent vaporization of the liquid argon. The bed is then regenerated by draining residual liquid argon from the adsorbent bed, introducing the residual liquid argon back into the air separation plant and then desorbing the oxygen impurities (Continued)

with a regeneration gas. After regeneration, the adsorbent bed is refilled with purified liquid argon prior to being brought back on-line.

5 Claims, 1 Drawing Sheet

Related U.S. Application Data

(60) Provisional application No. 61/771,468, filed on Mar. 1, 2013.

(52) U.S. Cl.
CPC ....... *F25J 3/04303* (2013.01); *F25J 3/04412* (2013.01); *F25J 3/04678* (2013.01); *C01B 2210/0014* (2013.01); *C01B 2210/0034* (2013.01); *C01B 2210/0045* (2013.01); *F25J 2205/02* (2013.01); *F25J 2205/60* (2013.01); *F25J 2205/66* (2013.01); *F25J 2215/58* (2013.01); *F25J 2220/04* (2013.01)

(58) Field of Classification Search
CPC .. F25J 3/04715; F25J 3/04733; F25J 2205/60; F25J 2205/66; F25J 2205/68; F25J 2205/70; F25J 2215/58; B01D 53/04; B01D 53/0438; B01D 53/0454; B01D 53/0462; B01D 2256/18; B01D 2259/416; B01D 2257/104
See application file for complete search history.

(56) References Cited

U.S. PATENT DOCUMENTS

| | | | |
|---|---|---|---|
| 4,717,406 A | 1/1988 | Giacobbe | |
| 4,734,199 A * | 3/1988 | Nagji | B01D 15/00 210/674 |
| 5,114,445 A | 5/1992 | Burton et al. | |
| 5,159,816 A * | 11/1992 | Kovak | F25J 3/04303 62/648 |
| 5,174,979 A | 12/1992 | Chao et al. | |
| 5,601,634 A * | 2/1997 | Jain | B01D 53/0462 62/908 |
| 5,685,172 A | 11/1997 | Darredeau et al. | |
| 5,707,425 A | 1/1998 | D'Amico et al. | |
| 5,730,003 A | 3/1998 | Nguyen et al. | |
| 5,784,898 A | 7/1998 | Gary | |
| 5,868,199 A | 2/1999 | Lavin | |
| 6,023,945 A | 2/2000 | Wong et al. | |
| 6,083,301 A | 7/2000 | Gary et al. | |
| 6,240,744 B1 | 6/2001 | Agrawal et al. | |
| 6,250,106 B1 | 6/2001 | Agrawal | |
| 6,351,971 B1 | 3/2002 | Nguyen et al. | |
| 6,572,838 B1 | 6/2003 | Sebastian et al. | |
| 7,234,691 B2 | 6/2007 | Kovak | |
| 7,294,172 B2 | 11/2007 | Baksh et al. | |
| 7,452,407 B2 | 11/2008 | Golden et al. | |
| 7,501,009 B2 | 3/2009 | Graham et al. | |
| 8,480,860 B2 | 7/2013 | Kovak | |
| 2007/0209508 A1 | 9/2007 | Graham et al. | |
| 2011/0138856 A1 | 6/2011 | Howard et al. | |
| 2012/0141868 A1 | 6/2012 | Hirano | |
| 2014/0245781 A1 | 9/2014 | Kechagia et al. | |
| 2014/0245782 A1 | 9/2014 | Barrett et al. | |
| 2014/0249023 A1 | 9/2014 | Barrett et al. | |

FOREIGN PATENT DOCUMENTS

| | | |
|---|---|---|
| DE | 10 2007 035619 | 2/2009 |
| EP | 0 514 163 A2 | 11/1992 |
| EP | 0 893 156 A2 | 1/1999 |
| EP | 0 956 928 A1 | 11/1999 |
| EP | 1 291 067 A2 | 3/2003 |
| JP | 09201530 A | 1/1996 |
| WO | 03/011434 A1 | 2/2003 |
| WO | 2011/024687 A1 | 3/2011 |

* cited by examiner

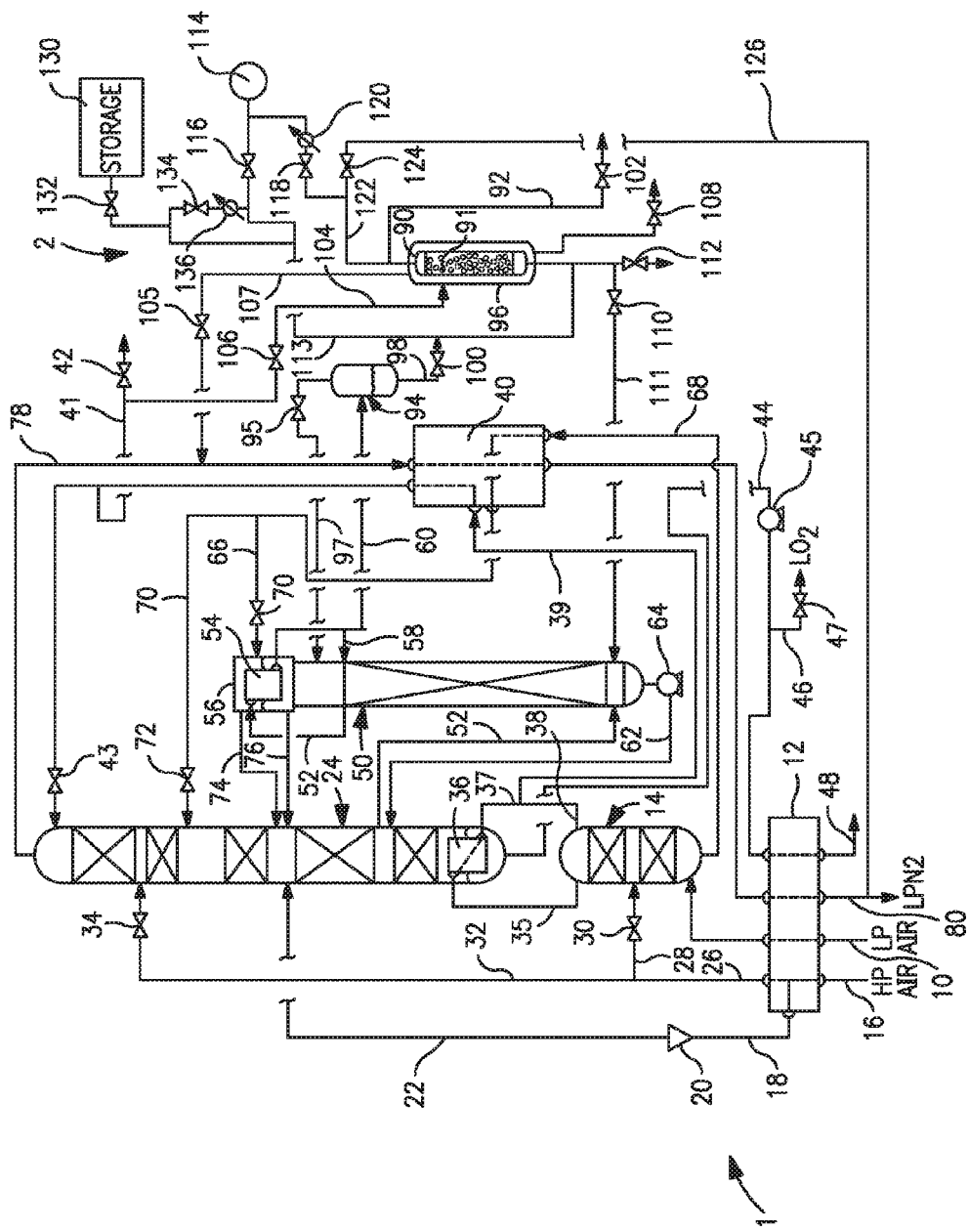

ARGON PRODUCTION METHOD AND APPARATUS

RELATED APPLICATIONS

The present application is a divisional application that claims the benefit of and priority to U.S. patent application Ser. No. 14/192,003, filed on Feb. 27, 2014, which claims the benefit of U.S. Provisional Application Serial No. 61/771,468, filed on Mar. 1, 2013, which is incorporated herein by reference.

FIELD OF THE INVENTION

The present invention relates to a method and apparatus for producing argon in which argon is separated from air within a cryogenic air separation plant having an argon column. A liquid argon stream is produced from the air separation plant subsequently purified by removing oxygen impurities within an adsorbent bed. More particularly, the present invention relates to such a method and apparatus in which the adsorbent bed is operated in accordance with a temperature swing adsorption process in which the adsorbent bed is maintained at a reduced temperature that is sufficient to prevent vaporization of the liquid argon stream through indirect heat exchange with a coolant and during regeneration of the adsorbent bed, residual liquid argon contained in the adsorbent bed is introduced back into the cryogenic air separation plant and is thereby recovered.

BACKGROUND OF THE INVENTION

Air is typically separated in a dual pressure (double column based) distillation system. In this process, air is compressed to an elevated pressure (5.5+ bara), pre-purified, cooled and directed to a moderate pressure nitrogen rectification section where the feed air is distilled into a nitrogen rich vapor/liquid overhead and an oxygen enriched bottom liquid (kettle). These enriched liquid streams are subsequently subcooled, depressurized and fed to a low pressure (near ambient) distillation system where the oxygen rich kettle liquid is further fractionated into an essentially pure oxygen bottoms product and a further enriched nitrogen overhead product(s) and/or waste stream.

Argon constitutes a minor portion of ambient air (0.93%). However, it possesses a high unit value. As a consequence, its recovery from the base double column system is often desirable. Argon can be recovered from the double column system by extracting an argon rich draw from the upper column near the base of the nitrogen stripping section. The argon rich stream is then directed to an argon rectification section where argon may be produced overhead. The overhead condensation load is typically imparted to at least a portion of the oxygen rich column bottoms stream (prior to introduction into the primary low pressure distillation column). Argon can be produced directly by "superstaged" distillation to merchant liquid purities (~1, ppm O2, ~180, stages) or to intermediary purities (1, to 2%, ~50, stages) and subsequently refined by catalytic oxidation (typically employing hydrogen).

Modern air separation plants almost exclusively employ superstaged distillation for high purity argon production. However, such systems will typically attain column/coldbox heights in excess of 200+ , ft. As a consequence, considerable expense is incurred to attain high purity (split columns, multiple coldbox sections, liquid reflux/return pumps). This situation is further compounded for large air separation plants where column feed/draw re-distribution points typically consume more height. There exists a need to drastically shorten the argon distillation column without returning to the use of catalytic combustion (and its associated complexity and operating costs). The subject invention targets the economically weakest portion of the argon-oxygen distillation. The upper half of the argon column serves to remove less than 1% of the oxygen contained in argon column feed. Since distillation cost is proportional to the logarithm of purity a substantial cost (and height) is incurred in attaining 1, ppm O2, in argon.

There have been integrations within the prior art between air separation plants and adsorbents with the intent to eliminate expensive post conditioning systems to remove oxygen and nitrogen from the argon. For instance, in U.S. Pat. No. 4,717,406, a liquid phase adsorption process wherein in a feed from a cryogenic plant is directed to an adsorption system. The adsorption system serves to purify the liquefied gas prior to introducing it into a liquid storage tank. The targeted applications include the removal of water and CO2, from electronics grade gases (e.g. LO2). The regeneration method disclosed is temperature swing. U.S. Pat. No. 5,685,172, details a process targeting the removal of trace oxygen (and CO) from a variety of inert gases. The process also notes direct liquid processing and argon is cited as an example fluid. Metal oxides (CuO, MnO2) are detailed as adsorbents for oxygen. Regeneration is accomplished through the use of a reducing gas (H2) at modest temperature (150~250, C.). The use of a reducing gas makes it difficult to integrate the adsorbent beds with the air separation plants in that the reducing gas is not made in the air separation plant, but must be on hand to regenerate the adsorbents. More importantly, during regeneration of the adsorbent, argon rich fluids will be lost from the process. U.S. Pat. No. 7,501,009, details a cyclic adsorption process for the purification of argon. The process may be operated at cryogenic temperature while processing crude argon in the gaseous state. Zeolites are noted as possible adsorbents for a pressure swing adsorption (PSA). Regeneration gas is directed back to the argon-oxygen rectification column. The problem with this type of integration is that it requires the inclusion of a crude argon compressor (and associated power consumption). Lastly, U.S. Pat. No. 5,601,634, discloses an integration in which both nitrogen and oxygen contained in the argon are removed in adsorbent beds. The problem with this type of integration is that the vapor must be re-liquefied resulting in increased power consumption.

As will be discussed, among other advantages, the present invention provides an integration in which an argon rich liquid stream produced through separation of the argon from air in an air separation plant is purified with an adsorbent to allow the purified liquid to be conventionally stored and that can easily be integrated with an air separation plant.

SUMMARY OF THE INVENTION

The present invention provides a method of producing a purified liquid argon product in which argon is separated from air within a cryogenic air separation plant having an argon column to separate the argon from oxygen. Liquid argon having oxygen impurities is produced from the separation of the argon from the oxygen. An impure liquid argon stream composed of part of the liquid argon is purified by introducing the impure liquid argon stream into an adsorbent bed and adsorbing the oxygen impurities in an adsorbent bed to produce a purified liquid argon stream constituting the purified liquid argon product. The adsorbent bed is subjected to an alternating cycle having an on-line phase where the impure liquid argon stream is purified within the adsorbent bed and an off-line phase where the adsorbent contained in the adsorbent bed is regenerated. During the on-line phase of the alternating cycle, the adsorbent bed is maintained at reduced temperature that is sufficient to prevent vaporization of the liquid argon stream by indirectly exchanging heat from the adsorbent bed to a coolant stream. During the off-line phase of the alternating cycle, introduction of the impure liquid argon stream into the adsorbent bed is terminated and the adsorbent bed is drained of residual liquid argon contained in the adsorbent bed to produce a residual liquid argon stream. The residual liquid argon stream is introduced into the cryogenic air separation plant as a liquid or a vapor or a mixture of liquid and vapor. The adsorbent is regenerated by desorbing the oxygen impurities, at least in part, by passing a regeneration gas through the adsorbent bed. Prior to the on-line phase of the alternating cycle, the adsorbent bed is refilled with purified argon liquid composed of the liquid argon product. It is understood that adsorbent bed subjected to the alternating cycle could be one adsorbent bed of a multiple bed adsorbent cycle operated in an out-of-phase sequence and that the invention as set forth in the claims is intended to cover such a multiple bed adsorbent cycle and not be limited to the use of a single adsorbent bed.

The adsorbent can be a molecular sieve and the alternating cycle can be a temperature swing adsorption process. In such case, the regeneration gas is a heated regeneration gas stream and the adsorbent bed is warmed to desorb adsorbed oxygen by terminating indirect heat exchange between the adsorbent bed and the coolant stream and passing the heated regeneration gas stream into the adsorbent bed. Prior to refilling the adsorbent bed with the purified argon liquid, the indirect heat exchange between the adsorbent bed and the coolant stream is resumed. A nitrogen-rich vapor column overhead stream, composed of nitrogen-rich vapor, can be removed from either the low pressure column or the high pressure column of the cryogenic air separation plant and at least partially warmed in a main heat exchanger of the cryogenic air separation plant to help cool a compressed and purified air stream composed of the air to be separated within the cryogenic air separation plant. The regeneration gas can be formed from part of the nitrogen-rich vapor column overhead stream after having been at least partially warmed the main heat exchanger. During the on-line periods of the alternating cycle, a subsidiary liquid argon stream is produced that contains a further part of the liquid argon and the subsidiary liquid argon stream is introduced into a storage tank to store the further part of the liquid argon. A displacement gas stream is generated by removing a subsidiary liquid argon stream from the storage tank and vaporizing the subsidiary liquid argon stream and the displacement gas stream is introduced into the adsorbent bed to assist in motivating the residual liquid argon stream from the adsorbent bed to the cryogenic air separation plant.

The coolant stream can be formed from shelf liquid produced in the high pressure column. The liquid argon can be produced from argon-rich vapor produced as column overhead within the argon column and condensed in a condenser or from the argon column as an interstage liquid. The liquid argon is introduced into a bulk argon storage tank and the impure liquid argon stream is withdrawn from the bulk argon storage tank for processing in the adsorbent bed.

The present invention also provides an apparatus for producing a purified liquid argon product that comprises a cryogenic air separation plant and an argon purification system. The cryogenic air separation plant is configured to separate the argon from air and has an argon column to separate the argon from oxygen and a means for producing liquid argon having oxygen impurities from the argon separated from the oxygen. The argon purification system is integrated within the cryogenic air separation plant and has a flow network connected to the liquid argon producing means so as to receive an impure liquid argon stream composed at least in part of the liquid argon and an adsorbent bed receiving the impure liquid argon stream. The adsorbent bed has an adsorbent to adsorb the oxygen impurities and thereby produce a purified liquid argon stream constituting the purified liquid argon product and means for indirectly exchanging heat from the adsorbent bed to a coolant stream, thereby preventing vaporization of the liquid argon stream. The flow network is configured to subject the adsorbent bed to an alternating cycle having an on-line phase where the impure liquid argon stream is purified within the adsorbent bed and an off-line phase where the adsorbent contained in the adsorbent bed is regenerated.

The flow network has a piping system and a system of valves within the piping system configured to selectively introduce the coolant stream into the adsorbent bed indirect heat exchange means and the impure liquid argon stream into the adsorbent bed during the on-line phase and to conduct a regeneration sequence during the off-line phase. The regeneration sequence comprises: terminating introduction of the liquid argon stream into the adsorbent bed; draining the adsorbent bed of residual liquid argon contained in the adsorbent bed to produce a residual liquid argon stream; passing a regeneration gas through the adsorbent bed to at least in part regenerate the adsorbent by removing the oxygen impurities from the adsorbent; and prior to the on-line phase of the alternating cycle, introducing purified liquid argon composed of the liquid argon product into the adsorbent bed and thereby refilling the adsorbent bed with the purified argon liquid. The piping system of the flow network is connected to the cryogenic air separation plant so that during the off-line phase, the residual liquid argon stream passes into the cryogenic air separation plant as a liquid or a vapor or a mixture of liquid and vapor and is thereby recovered.

The adsorbent can be a molecular sieve and the alternating cycle can be a temperature swing adsorption process. In such case, the regeneration gas is a heated regeneration gas stream to warm the adsorbent bed and thereby desorb adsorbed oxygen. The regeneration sequence also comprises terminating introduction of the coolant stream into the adsorbent bed indirect heat exchange means after the adsorbent bed is drained of residual argon. Resuming introduction of the coolant stream into the adsorbent bed indirect heat exchange means prior to refilling the adsorbent bed with the purified argon liquid.

The cryogenic air separation plant has a main heat exchanger to help cool a compressed and purified air stream composed of the air to be separated and the main heat exchanger is in flow communication with a low pressure column or a high pressure column of the cryogenic air separation plant so that a nitrogen-rich vapor column overhead stream, composed of nitrogen-rich vapor produced in either the high pressure column or the low pressure column, at least partially warms within the main heat exchanger. The piping system is connected to the main heat exchanger so that the regeneration gas is formed from part of the nitrogen-rich vapor column overhead stream after having been at least partially warmed the main heat exchanger. The argon purification system can have a storage tank and a vaporizer positioned between the storage tank and the adsorbent bed.

In such case the piping system is connected to the storage tank. Additionally, the flow network is configured such that during the on-line phase of the alternating cycle, a subsidiary liquid argon stream is produced that contains a further part of the liquid argon and the subsidiary liquid argon stream is introduced into a storage tank to store a further part of the liquid argon and during the off-line phase of the alternating cycle, a subsidiary liquid argon stream flows from the storage tank to the vaporizer, thereby vaporizing the subsidiary liquid argon stream to form a displacement gas stream and the displacement gas stream is introduced into the adsorbent bed to assist in motivating the residual liquid argon stream from the adsorbent bed to the cryogenic air separation plant. In any embodiment of the present invention the cryogenic air separation plant can have a condenser reboiler located in the low pressure column to produce shelf liquid. The piping system of the flow network is in flow communication with the condenser reboiler so that the coolant stream is formed from shelf liquid. Additionally, the liquid argon producing means can be a condenser connected to the argon column to condense argon-rich vapor produced as column overhead within the argon column or an outlet of the argon column to discharge the liquid argon from the argon column as an interstage liquid. The flow network can have a bulk argon storage tank positioned between the argon column or the condenser and the adsorbent bed so that the liquid argon is introduced into a bulk argon storage tank and the impure liquid argon stream passes from the bulk argon storage tank to the adsorbent bed during the on-line phase.

The subjection invention possesses several advantages relative to current and proposed argon refining processes. In contrast to the current "superstaged" distillation approach to argon refining, the use of a hybrid-liquid adsorption system will drastically reduce overall coldbox space. Relative to past liquid phase argon adsorption processing arrangements of the prior art, the regeneration gas/liquids are effectively recovered by utilizing the existing cryogenic distillation infrastructure. This is a critical element of economic viability since foregoing the value of the liquid argon contained in the vessels is critical to economic operation. Relative to prior art gas adsorption processes feed gas compression is not required. In addition, by processing liquid argon directly, the associated size of the equipment/vessels is drastically reduced. The present invention therefore provides an inherent cost and operating expense benefits over the prior art.

BRIEF DESCRIPTION OF THE DRAWINGS

While the specification concludes with claims specifically pointing out the subject matter that Applicant regards as his invention, it is believed that the invention will be better understood when taken in connection with the accompanying drawing in which the sole figure is a schematic process flow diagram of an apparatus for carrying out a method in accordance with the present invention.

DETAILED DESCRIPTION

In reference to FIG. 1, an air separation plant 1 is illustrated that is integrated with an argon purification system 2. The subject equipment is typically enclosed in an insulated enclosure (or coldbox—not shown). Incoming air by way of a compressed and pre-purified feed air stream 10 is separated into oxygen and nitrogen-rich fractions in high and low pressure distillation columns 14 and 24. Argon is separated in an argon column 50 to produce liquid argon having oxygen impurities. An impure liquid argon stream 60 composed of part of the liquid argon produced in the argon column 50 is purified in the argon purification system 2 to produce a purified liquid argon product 92.

It should be noted that high and low pressure distillation columns 14 and 24 and argon column 50 represent distillation columns in which vapor and liquid are counter-currently contacted in order to affect a gas/liquid mass-transfer based separation of the respective feed streams. Columns 14, 24 and 50 will preferably employ packing (structured or dumped) or trays or combinations thereof (as is well known to the art). Although not illustrated, but as would be understood by those skilled in the art, the incoming air is compressed in a main air compressor and then pre-purified in a pre-purification unit to remove high boiling contaminants from the air. Such a unit has beds of adsorbents to adsorb such contaminants as water vapor and carbon dioxide and possibly also, hydrocarbons. Furthermore additional columns can be added to this base configuration for purposes of further refinement of argon and/or the recovery of rare gases like krypton and xenon.

More specifically, the compressed, pre-purified feed air stream 10 ("LP AIR"), resulting from the compression and pre-purification of the air, as described above, is cooled to near saturation within a primary or main heat exchanger 12 and subsequently directed to the base of the high pressure distillation column 14. The high pressure distillation column 14 operates at a pressure in the range of 5.0, to 6.0, bara. A high pressure air stream 16 ("HP AIR") is also fed to the main heat exchanger 12. This stream is generated by further compressing part of the air after having been compressed and purified. After partial traversal of main heat exchanger 12, a portion of this stream 18 is then work expanded through a turbine 20 to a pressure in the range of 1.1, to 1.5 bara. The resulting exhaust stream 22 is then introduced into an intermediary location of a low pressure column 24. It should be noted that the work of expansion may be employed for other compression service or used to generate electric power. The remaining high pressure air fraction is further cooled and condensed within the main heat exchanger 12 to produce a high pressure liquid air stream 26. In general, the resulting high pressure liquid air stream 26 will exit at a temperature in the range of 98.0, to 103.0, K. The high pressure liquid air stream 26 is then split into two portions, 28 and 32. Portion 28 is directed through valve 30 and into the high pressure column 14. The remaining portion 32 is expanded through valve 34 into the low pressure column 24. In general, the total high pressure air stream 16 will constitute 30.0, to 40.0% of the total air entering the plant. Of this fraction between 5.0% and 15.0% will likely be expanded, the remaining fractions are split between the high and low pressure columns 14 and 24.

Within the high pressure column 14, the expanded liquid air and gaseous air are separated into a nitrogen rich overhead (shelf) and oxygen rich bottoms (kettle). The condensation of the overhead gas/nitrogen is effected by introducing a nitrogen-rich vapor stream 35 main condenser 36. The latent heat of condensation is imparted to the (oxygen rich) bottoms fluid of the low pressure column 24. The resulting nitrogen rich liquid stream 37 is then divided. A portion 38 serves to reflux column 14 while the remaining shelf liquid stream 39 is directed to the low pressure column 24 as reflux.

A kettle liquid stream 68, to be discussed hereinafter, composed of the bottoms liquid of the high pressure column 14 and the reflux stream 38 are cooled against warming nitrogen derived from column 24 within subcooler/heat exchanger 40. A liquid nitrogen product stream 41 composed of a portion of the reflux stream 39 may be taken as a product through valve 42 and sent to suitable storage (not shown). The substantial fraction of the remaining shelf liquid contained in reflux stream 39 serves to reflux the low pressure column 24 after flashing through valve 43.

Within low pressure column 24, the kettle liquid, liquid air and shelf nitrogen are further separated into a nitrogen rich overhead and into an oxygen rich bottoms liquid (typically of 99.5+, % purity). The overhead nitrogen stream 78 is warmed in subcooler/heat exchanger 40 and main heat exchanger 12. Alternatively, two streams of nitrogen may be extracted from the low pressure column 24 (a product and waste nitrogen stream). A portion of the warmed nitrogen often finds use as a purge/sweep fluid for purposes of regenerating warm end adsorbent systems of the pre-purification unit.

An oxygen rich liquid stream 44 is extracted from the base of the low pressure column 24. This stream is then compressed by a combination of gravitational head and/or mechanical pump 45. The pressurized liquid oxygen stream may then be split into a liquid product fraction 46 which is directed through valve 47 (into suitable storage not shown) and a product stream to be warmed. The remaining liquid oxygen fraction is vaporized and warmed within exchanger 12 and emerges as high pressure gaseous product stream 48 that may be used directly or directed to a distribution pipeline. The bulk of the high pressure air stream 16 is liquefied for purposes of vaporizing the liquid oxygen (as described). The resulting liquid air stream is distributed into the column system by way of valves 30 and 34, as also described above.

Argon rectification column 50 which operates at a pressure comparable to low pressure column 24 and typically employs 50, and 180, stages. A gaseous argon rich vapor feed (8.0%-15.0% Argon) is extracted from a lower interstage section of the low pressure column 24 and is directed to the base of argon column 50. Argon column 50 serves to rectify the feed by separating argon from the oxygen into an argon enriched overhead stream 52 (typically containing trace levels of oxygen and potentially nitrogen). The argon-rich vapor overhead gas stream 52 of column 50 is condensed within latent exchanger 54 contained within a shell 56. The resulting liquid argon stream is split into a column reflux stream 58 and an impure liquid argon stream 60 that will be further purified in a manner to be described hereinafter. From the base of argon column 50, an argon depleted oxygen rich stream 62 is pressurized by mechanical pump 64 and directed back to column 24 for further rectification. The latent heat of overhead argon condensation is imparted to a portion 66 of kettle liquid stream 68 which has been introduced through valve 70 into the shell 56. The remaining kettle liquid stream 70 is directed through valve 72 and into column 24. Within exchanger-vessel 56, pool boiling occurs with natural circulation (thermo-siphon) flow through multi-pass (brazed aluminum) exchanger 54. The resulting evaporated kettle liquid and residual oxygen enriched drain as vapor and liquid phase streams 74 and 76 are then directed into the low pressure column 24.

The kettle liquid stream 68 is subcooled within a subcooling heat exchanger 40 along with the reflux stream 39 through indirect heat exchange with a nitrogen-rich vapor stream 78 produced as a column overhead of the low pressure column 24. The nitrogen-rich vapor stream 78 is then warmed within the main heat exchanger 12 to produce a nitrogen product stream 80.

The impure liquid argon stream 60 having oxygen impurities is introduced into argon purification system 2 having an adsorbent bed 90 containing an adsorbent 91 that is designed to remove oxygen from the liquid argon stream. The adsorption of the oxygen impurities produces a purified liquid argon stream 92 that constitutes a purified liquid argon product. The argon purification system 2, in a manner that will be discussed, is capable of subjecting adsorbent bed 90 to an alternating cycle having an on-line phase where the impure liquid argon stream 60 is purified within the adsorbent bed 90 and an off-line phase where the adsorbent 91 contained in the adsorbent bed 90 is regenerated through desorption of the previously adsorbed oxygen impurities. During the on-line phase, the adsorbent bed 90 is maintained at a reduced temperature by indirectly exchanging heat from the adsorbent bed 90 to a liquid coolant stream 104 that will be discussed. This reduced temperature prevents vaporization of the liquid argon within the adsorbent bed 90 and production of a purified liquid argon stream 92 constituting the purified liquid argon product. The advantage of this is that the resulting purified liquid can be directly stored as opposed to the energy expenditure that would be incurred in reliquefying argon vapor for such purposes. During the off-line phase of the alternating cycle, the introduction of the impure liquid argon stream 60 into the adsorbent bed 90 is terminated and the adsorbent bed 90 is drained of residual liquid argon contained in the adsorbent bed 90 to produce a residual liquid argon stream 111, to be discussed, that can be recovered within the argon column 50 or the low pressure column 24. The advantage here is that the integration contemplated by the present invention reduces amounts of argon that would be otherwise lost in the regeneration of the adsorbent bed 90. As will be discussed, the adsorbent 91 is regenerated during the off-line phase by desorbing the oxygen impurities, at least in part, by passing a regeneration gas stream 126 through the adsorbent bed 90 and, after regeneration, residual regeneration gas is displaced from the adsorption bed 90 by passing an argon vapor stream from a storage source 130 through the adsorption bed, the argon vapor stream formed from the purified liquid argon product. Prior to the on-line phase of the alternating cycle, the adsorbent bed is refilled with purified argon liquid composed of the liquid argon product. Preferably and as shown in the illustrated embodiment, the regeneration of adsorbent 91 is conducted in accordance with a temperature swing adsorption cycle and as such the regeneration gas is a heated regeneration gas that would enable the adsorbent 91 to be heated and thereby release the previously adsorbed oxygen impurities. However, chemical sorbents are also possible in which the adsorbent 91, for example, is a metal oxide such as CuO or $MnO_2$, discussed above and regeneration is accomplished through the use of a reducing gas such as hydrogen at a modest temperature of between about 150, and 250° , C. As also discussed above, the use of such an adsorbent is a more complex and expensive integration than that contemplated with the use of a molecular sieve such as will be discussed below.

Although the process will be described with respect to the operation of a single bed it should be understood that multiple beds may be employed. In such situations, at least one bed may be purifying liquid argon while other beds may be in various states of regeneration. In the embodiment shown, a single adsorption system is shown. In order to accomplish this, the impure liquid argon stream 60 is directed to a batch storage tank 94 which may be operated at an elevated pressure (between 20.0, and 100.0, psig) for purposes of storing impure argon. The pressure of storage tank 94 may be controlled by pressure control valve 95 which may direct an vapor stream 97 back to the overhead of argon column 50. It should be noted that batch storage tank 94 may be comprised of several storage vessels connected together.

The adsorbent bed 90 is preferably filled with an adsorbent 91 that preferentially adsorbs oxygen from argon in the liquid phase. The adsorbent bed 90 is provided with a cooling jacket 96 that transfers heat from the liquid argon being purified in the adsorbent bed 90 to maintain the argon in the liquid state. As could be appreciated, in place of a cooling jacket, the adsorbent bed 90 could have a configuration similar to that of a shell and tube heat exchanger in which the shell side serves to provide a means for passage of the cooling fluid. Molecular sieve adsorbents such as zeolite 4A and lithium exchanged 4A have been shown to be effective adsorbents for the subject process. In particular, for the purification of an argon feed stream to a residual oxygen content no greater than 10, parts per million oxygen and most preferably no greater than 1, part per million oxygen impurities, the preferred zeolite is a type A zeolite ion exchanged with lithium cations in the ranges of 15, to 55, and/or 82, to 86, percent on a charge equivalent basis. In this case, the balance being replaced is sodium. During purification, an impure liquid argon stream 98, derived from the liquid argon stream 60 through batch tank 94, containing between 10, and 10,000, ppm $O_2$, and preferably 100, to 1,000, ppm $O_2$, is continuously fed through flow control valve 100. The adsorbent bed removes the trace oxygen and a purified liquid is removed from adsorbent bed 90 (generally containing less than 1, ppm $O_2$). The purified liquid argon stream 92 is then directed through valve 102 to suitable storage (not shown).

During adsorption, external heat leak into the adsorbent bed and the heat of oxygen adsorption will tend to warm the impure liquid argon stream and as such the bed/fluid requires cooling. The external cooling jacket 96 is provided so that a coolant stream, that can be a liquid nitrogen stream 104 composed of a further part of the reflux stream 39, is able to be directed through valve 106 and vaporized for purposes of cooling the adsorption bed 90. Vaporized nitrogen as a stream 107 will preferably be directed through pressure control valve 105 and subsequently combined with low pressure nitrogen stream 78 from the main column system. In general, the flow through valve 106 will be controlled in response to a liquid level sensor (not shown) associated with cooling jacket 96. The adsorption process will typically operate at pressure between 1.0, and 10.0, barg and the refrigerating jacket will be operated at a pressure between 1.0, and 4.0, barg. It should be noted that refrigerating fluids other than liquid nitrogen can be used to cool the adsorption system. Other candidates include liquid air, kettle, oxygen, argon or any number of inter-stage column mixtures (or even a cryogenic, non-air refrigerant). Although not preferred, the use of cryogenic gases (e.g. lower column shelf vapor) can be used in lieu of liquid cryogens. It should be noted that liquid nitrogen employed for providing refrigeration through jacket 96 may be obtained from a separate tank (or source, or other plant). Such liquid tankage can be at an elevated pressure to facilitate fluid flow.

After sufficient oxygen has been loaded onto the adsorption bed, the adsorbent 91 must be regenerated and in furtherance thereof, the adsorbent bed 90 is subjected to the off-line phase. It is to be pointed out that during the on-line phase when the oxygen is being adsorbed in adsorbent 91, valves 100, 102, 106 and 105 are all open to permit the liquid argon stream to enter the adsorbed bed and be purified and to allow the coolant stream to enter the cooling jacket 96 and be discharged. At such time, pressure of the coolant that is vaporized is controlled by control valve 105. Additionally, as will be discussed, a valve 116 is also set in the open position to store impure argon. The other valves shown in the Figure, namely valves 110, 112, 118, 124, 132 and 134 are all closed.

When the adsorbed bed is to be brought off-line, as a first step, valves 100 and 102 are closed and for the period of time that adsorbent bed 91 is regenerated, the impure liquid argon accumulates in bulk storage tank 94 given that there is a single adsorption bed. When off-line, valve 106 is set in the closed position and the cooling jacket 96 is drained of coolant and sent to suitable storage (or drain vaporizer) not shown through valve 108. Either before or during the draining of the coolant, given the considerable mass of liquid argon contained within the bed (and its associated value) the valve 110 is set in an open position and residual liquid argon, as residual liquid argon stream 111, is directed back into argon column 50 (preferably the liquid is directed to a point above return pump 64). In order to effectively remove the impure liquid argon from bed 90 a displacement gas may be employed. This displacement gas can be formed by introducing an impure liquid argon stream through transfer line 113 into a storage tank 114 by opening a valve 116 during the time that the adsorbent bed 90 is on-line and adsorbing oxygen impurities. Therefore, during the off-line phase, valve 116 is also set in a closed position. The displacement gas is generated by opening a valve 118 to cause a flow of the argon through an atmospheric vaporizer 120 which is introduced into the adsorbent bed 90 through line 122. This displacement gas will help motivate residual argon liquid stream 111 from adsorbent bed 90 back to the argon column 50.

In order to regenerate bed 90 it is necessary increase its temperature generally to a temperature near 200 K. After drainage, valves 110 and 118 are subsequently closed (no flow). A flow of warmed nitrogen is preferably passed through the adsorbent bed 90 by opening a valve 124. The opening of valve 124 allows the regeneration gas stream 126, composed of the warm low pressure nitrogen product 80, to pass through the adsorbent bed 90 as a regeneration gas and thereby warm the bed and desorb the previously adsorbed oxygen. The nitrogen serves to warm the bed through direct contact. The nitrogen may then be directed to vent through valve 112 or combined with warming nitrogen streams taken from the overhead of the argon column 50. Alternatively, a vaporized and warmed shelf nitrogen stream may be employed for warming the bed or a gas blower may be used to increase the pressure of the nitrogen flowing through the bed.

After the adsorbent has been regenerated with the use of the warmed nitrogen, valve 124 is closed. An argon-rich gas from storage 130 generated from the purified liquid argon product, may then be introduced into the adsorbent bed 90 by opening valve 132 to vaporize the flow in a vaporizer 136 in order to displace/purge the bed of residual nitrogen. The argon-rich gas flow through transfer line 113. Once the nitrogen has been removed, the adsorbent bed 90 may be isolated from the vent by closing valve 112. A $N_2$, compositional analyzer may be employed (not shown) for purposes of assessing residual $N_2$, content. The cooling jacket 96 may then be filled with liquid nitrogen (valve 106 open and valve 108 closed). An argon product liquid stream may then be fed to bed 90 from storage 130 through transfer line 113 by opening a valve 132 and closing valve 134. The adsorbent bed 90 thus being filled with pure liquid argon is then fed with impure argon taken from column 50 (or vessel 94 through valve 100 as shown). It is to be noted that it is possible to delay the refilling of the cooling jacket 96 by refilling the adsorbent bed 90 with the pure liquid argon and allowing liquid argon to vaporize prior to complete cool down of the adsorbent bed. In such case, the resulting vapor could be recovered by being reintroduced into the cryogenic air separation plant and preferably the argon column 50. After cool down of the adsorbent bed, the cooling jacket 96 could then be refilled. In any case, the process or purification and regeneration is repeated on cyclic basis, in general total cycle time will be on the order of 1, week.

The subject invention is applicable to numerous embodiments of the triple column system. A number of process or equipment modifications can be employed. The column system itself may employ any combination of structured packing and/or trays. Numerous process arrangements may be employed (within the context of the triple column system).

In the illustrated embodiment, the impure liquid argon stream 60 is obtained from condensed column overhead vapor of the argon column 50. It is understood however, that a liquid argon stream to be purified might be taken several stages below the top of argon column 50 from 3, to 6, stages below the top of the column to help concentrate nitrogen in the vent. The impure liquid argon stream to be purified would therefore be removed from an interstage location of the argon column 50 rather than through the condensed liquid from exchanger 54. Another important variation to the subject column system might involve the use of a "high-ratio column". In the configuration shown in FIG. 1, ppm levels of nitrogen are attained in the feed stream to column 50. Such a configuration will entail the use of between 20, and 25, stages in the section of column 24 between the argon drawn and the lowermost kettle/vapor feed point. In the case of a high ratio based plant, upwards of about 500, ppm of N2, may be fed to the argon column 50. The overhead liquid produced from column 50 will contain up to about 1.0% or more N2. As a consequence a secondary refining column ("a high ratio column") may be employed. This column serves to strip out N2, from the argon. The subject invention can be effectively practiced with such an option. The high ratio column would be preferably positioned between the super-staged column 50 and the adsorption system.

Column 50 is often segmented at different locations. For instance, sometimes the return pump 64 actually returns inter-stage liquid back to a second section of the argon column 50. The subject invention will preferably return the impure residual liquid argon drain flow to a column location at which a close match of composition exists. In addition, in order to minimize capital, the adsorption system can be elevated (above the column 50, feed) for purposes of generating sufficient static head to motivate the liquid from bed 90 to column 50. Alternatively, a dedicated liquid pump can be employed to return the impure argon drain back to the column system. In this regard, the residual liquid argon drain flow could be introduced into the low pressure column 24 at the draw point from the low pressure column 24 to the argon column 50. Although not optimal, it is possible to re-vaporize the drain liquid in whole or in part prior to introduction into the column system (or even the feed air compression system).

The argon rich source 114 is preferably a low pressure storage tank (or tank farm). Alternatively, some portion of the argon could be stored at pressure and gaseous argon obtained directly from the tank vapor space (i.e. the tank could have pressure building coils). Similar considerations can be made for pure liquid argon streams directed through valve 118 (necessary for completing bed cooling). The displacement gas may also be comprised of an oxygen rich stream. Such a stream can be obtained from argon column 50 feed or from the base of column 24 or from the warm end of the main heat exchanger 12. In such instances, the impure argon drain and associated vent gas could then be directed to a lower location of column 24 (wherein argon stripping service is performed—and only argon and oxygen are present in the column).

It is common practice to deliver a product nitrogen stream (from a top hat section of column 24) and a waste nitrogen stream. The two nitrogen streams can be warmed in parallel within separate passages of subcooler 38 and the main heat exchanger 12. Similarly, multiple purity shelf streams can be generated from lower column 14. Any one of these streams once warmed (and/or vaporized) can be employed for purposes of supplying the heating medium necessary to warm the adsorption bed 90. It is also possible to employ a portion of the pre-purified feed air for purposes of bed warming.

It should be noted that flow control valves are typically employed in conjunction with flow measurement elements (orifice plates or venturi meters not shown). Gas regeneration flows proceeding through valves 124 and 118 can be controlled in this manner. Similarly, level control valves are used in conjunction with static head measurements of liquid level (e.g. on bed 90 and cooling jacket 96). The control logic required to effect level or flow control is well understood. A number of the valves shown in the attached figure can be configured with associated check valves in order to prevent back-flow into associated process equipment.

During the warming step, a warming fluid may also be employed in the jacket 96 for purposes of accelerating bed warming. Such a stream could be vented to atmosphere or combined with the waste nitrogen stream after passage through jacket 96.

In instances where the vent stream proceeding through vent valve 112 has an argon content greater than that of air it may be advantageously directed into the column system or back into the feed air compression system (in order to increase recovery). If sufficiently cold, the regeneration stream proceeding through valve 112 can be combined with the waste nitrogen stream to recoup its refrigeration value.

The subject adsorption system may be incorporated into the coldbox containing the main column system (or the main heat exchanger 12). Alternatively, the adsorber(s) may be housed in a separate coldbox or vacuum insulated vessel. Adsorbent bed geometry may be tube in tube or a tube bundle (i.e. a shell and tube exchanger). The refrigerating jacket is preferably configured about the subject tubes.

While the present invention has been described with reference to a preferred embodiment, it is understood that numerous additions and omissions can be made without departing from the spirit and scope of the present invention as set forth in the appended claims.

What is claimed is:

1. An apparatus for producing a purified liquid argon product comprising:
   a cryogenic air separation plant configured to separate argon from air and having an argon column to separate the argon from oxygen and produce an impure liquid argon stream having oxygen impurities;
   an argon purification system integrated within the cryogenic air separation plant and having a flow network connected to the impure liquid argon stream and an adsorbent bed configured to receive the impure liquid argon stream and having an adsorbent to adsorb the oxygen impurities and thereby produce a purified liquid argon stream constituting the purified liquid argon product and the argon purification system further configured for indirectly exchanging heat from the adsorbent bed to a coolant stream, thereby preventing vaporization of the impure liquid argon stream;

the flow network configured to subject the adsorbent bed to an alternating cycle having an on-line phase where the impure liquid argon stream is purified within the adsorbent bed and an off-line phase where the adsorbent contained in the adsorbent bed is regenerated;

the flow network having a piping system and a system of valves within the piping system configured to selectively introduce the coolant stream into the adsorbent bed and for introducing the impure liquid argon stream into the adsorbent bed during the on-line phase to prevent vaporization of the impure liquid argon stream and the purified liquid argon product during the on-line phase and to conduct a regeneration sequence during the off-line phase;

the regeneration sequence comprising: terminating introduction of the impure liquid argon stream into the adsorbent bed; draining the adsorbent bed of residual liquid argon contained in the adsorbent bed to produce a residual liquid argon stream; passing a regeneration gas through the adsorbent bed to at least in part regenerate the adsorbent by removing the oxygen impurities from the adsorbent; and, prior to the on-line phase of the alternating cycle, introducing purified liquid argon composed of the purified liquid argon product into the adsorbent bed and thereby refilling the adsorbent bed; and the piping system of the flow network connected to the cryogenic air separation plant so that during the off-line phase, the residual liquid argon stream passes into the argon column or a low pressure column of the cryogenic air separation plant as a liquid or a vapor or a mixture of liquid and vapor.

2. The apparatus of claim 1, wherein:

the adsorbent is a molecular sieve and the alternating cycle is a temperature swing adsorption process;

the regeneration gas is a heated regeneration gas stream to warm the adsorbent bed and thereby desorb adsorbed oxygen;

the regeneration sequence also comprises terminating introduction of the coolant stream into the adsorbent bed and the indirect heat exchange between the adsorbent bed and the coolant stream after the adsorbent bed is drained of residual argon; and resuming introduction of the coolant stream into the adsorbent bed and the indirect heat exchange between the adsorbent bed and the coolant stream prior to refilling the adsorbent bed with the purified argon liquid.

3. The apparatus of claim 2, wherein:

the cryogenic air separation plant has a main heat exchanger to cool a compressed and purified air stream composed of the air to be separated and the main heat exchanger is in flow communication with the low pressure column and a high pressure column of the cryogenic air separation plant so that a nitrogen-rich vapor column overhead stream, composed of nitrogen-rich vapor produced in either the high pressure column or the low pressure column, at least partially warms within the main heat exchanger; and the piping system is connected to the main heat exchanger so that the regeneration gas is formed from part of the nitrogen-rich vapor column overhead stream after having been at least partially warmed in the main heat exchanger.

4. The apparatus of claim 3, wherein:

the argon purification system further comprises a storage tank and a vaporizer positioned between the storage tank and the adsorbent bed and the piping system is connected to the storage tank; and the flow network is configured such that during the on-line phase of the alternating cycle, a subsidiary liquid argon stream is produced that contains a further part of the impure liquid argon stream and the subsidiary liquid argon stream is introduced into the storage tank and during the off-line phase of the alternating cycle, a liquid argon stream flows from the storage tank to the vaporizer, thereby vaporizing the liquid argon stream to form a displacement gas stream and the displacement gas stream is introduced into the adsorbent bed to assist in motivating the residual liquid argon stream from the adsorbent bed to the cryogenic air separation plant.

5. The apparatus of claim 3, wherein:

the cryogenic air separation plant is configured to produce shelf liquid in the high pressure column or the low pressure column; and the piping system of the flow network is in flow communication with the high pressure column or the low pressure column so that coolant stream is formed from the shelf liquid of the cryogenic air separation plant.

\* \* \* \* \*